(12) United States Patent
Nickel et al.

(10) Patent No.: US 8,481,775 B2
(45) Date of Patent: *Jul. 9, 2013

(54) METHOD FOR IMPROVING THE COLOR INDEX OF ORGANOPOLYSILOXANES

(75) Inventors: Friedhelm Nickel, Tübingen (DE); Peter Will, Mössingen (DE)

(73) Assignee: DSM IP Assets B.V., Heerlen (NL)

( * ) Notice: Subject to any disclaimer, the term of this patent is extended or adjusted under 35 U.S.C. 154(b) by 22 days.

This patent is subject to a terminal disclaimer.

(21) Appl. No.: 13/132,139

(22) PCT Filed: Nov. 27, 2009

(86) PCT No.: PCT/EP2009/065971
§ 371 (c)(1),
(2), (4) Date: Aug. 22, 2011

(87) PCT Pub. No.: WO2010/063649
PCT Pub. Date: Jun. 10, 2010

(65) Prior Publication Data
US 2011/0294964 A1 Dec. 1, 2011

(30) Foreign Application Priority Data
Dec. 1, 2008 (EP) .................................. 08170373

(51) Int. Cl.
*C07F 7/08* (2006.01)
(52) U.S. Cl.
USPC ....................................................... 556/441

(58) Field of Classification Search
None
See application file for complete search history.

(56) References Cited

U.S. PATENT DOCUMENTS

| | | | |
|---|---|---|---|
| 6,114,559 A * | 9/2000 | Richard et al. ................. | 556/419 |
| 6,123,929 A * | 9/2000 | Gonzenbach et al. .......... | 424/59 |
| 6,193,959 B1 * | 2/2001 | Bernasconi et al. ........... | 424/59 |
| 6,344,186 B1 * | 2/2002 | Hansenne et al. .............. | 424/60 |
| 6,346,595 B1 * | 2/2002 | O'Lenick, Jr. .................. | 528/29 |
| 6,416,746 B1 * | 7/2002 | Bringhen et al. ............... | 424/59 |
| 2001/0023293 A1* | 9/2001 | Huber ............................ | 548/257 |
| 2001/0053856 A1* | 12/2001 | Leduc et al. ................... | 548/110 |
| 2006/0160976 A1* | 7/2006 | Berg-Schultz et al. ......... | 528/10 |

FOREIGN PATENT DOCUMENTS
WO WO 2004/007592 1/2004

OTHER PUBLICATIONS

International Search Report for PCT/EP2009/065971, dated Jan. 26, 2010.
Written Opinion for PCT/EP2009/065971, dated Jan. 26, 2010.

* cited by examiner

*Primary Examiner* — Robert S Loewe
(74) *Attorney, Agent, or Firm* — Nixon & Vanderhye P.C.

(57) ABSTRACT

The present invention relates to method for improving the color index of organopolysiloxanes functionalized with at least one UV-light absorbing group said method comprising the step of contacting said group carrying organopolysiloxanes with a hydroxy carboxylic acid or a cyclic ester thereof in an organic solvent.

12 Claims, No Drawings

METHOD FOR IMPROVING THE COLOR INDEX OF ORGANOPOLYSILOXANES

This application is the U.S. national phase of International Application No. PCT/EP2009/065971 filed 27 Nov. 2009 which designated the U.S. and claims priority to EP Patent Application No. 08170373.8 filed 1 Dec. 2008, the entire contents of each of which are hereby incorporated by reference.

The present invention relates to method for improving the color index of organopolysiloxanes functionalized with at least one UV-light absorbing group said method comprising the step of contacting said group carrying organopolysiloxanes with a hydroxy carboxylic acid or a cyclic ester thereof in an organic solvent.

UV filter agents with a molecular weight of above 1000 Dalton are highly interesting to the cosmetic industry as due to the high molecular weight they exhibit a negligible systemic exposure due to a lack of transdermal penetration.

Organopolysiloxane functionalized with at least one UV-light absorbing group are known as UV-filter agents and are prepared by hydrosilylation, i.e. the addition of Si—H bonds to an unsaturated bond attached to a UV-light absorbing group such as e.g. disclosed in WO92/20690, EP1142930, EP358584, EP1885769, EP1494642, EP1521798, EP 388218, EP660701 or EP1000950.

However, the products resulting from the hydrosilylation process often exhibit an unwanted yellow to brownish discoloration, which is not accepted by the cosmetic industry. Even though it is possible to discolor the products by post-treatment with adsorbents such as active charcoal, these processes are tedious, need high amounts of solvents and result in reduced yields.

Thus, there is an ongoing need for a simple, economically attractive and environmentally benign method which allows the preparation of organopolysiloxanes functionalized with at least one UV-light absorbing group with a low color index in good yields by means of a simple industrial process.

Surprisingly, it has been found that hydroxy carboxylic acids or cyclic esters thereof are suitable for improving the color index of an organopolysiloxanes functionalized with a benzalmalonate.

Thus, the invention relates to a method for improving the color index of an organopolysiloxanes functionalized with at least one UV-light absorbing group said method comprising the step of contacting said organopolysiloxanes functionalized with at least one UV-light absorbing group with a hydroxy carboxylic acid or a cyclic ester thereof in an organic solvent.

The degree of coloration of the organopolysiloxanes functionalized with at least one UV-light absorbing group before and after the treatment can be determined by methods known to a person skilled in the art such as e.g. by means of color value systems such as the Gardner Index (yellowness index) or the APHA color index.

The organopolysiloxanes functionalized with at least one UV-light absorbing group exhibit in particular a Gardner value of less than 2.9, in particular of less than 2.5, such as in the range of 0.01 to 2 after having been contacted with the hydroxy carboxylic acid or a cyclic ester thereof.

The term organic solvent as used according to the present invention relates to carbon-containing chemicals suitable for dissolving the organopolysiloxanes functionalized with at least one UV-light absorbing group which have a low boiling point and evaporate easily or can be removed by distillation, leaving the dissolved substance behind. In particular, the boiling points of the organic solvent are below 300° C., in particular below 200° C., even more particular below 150° C. such as below 100° C. and can thus removed easily at normal or reduced pressure such as at 20 mbar, 1 mbar or even lower pressures. In particular suitable are linear, branched or cyclic $C_{1-8}$ alcohols such as methanol, ethanol, propanol, isopropanol, butanol, isobutyl alcohol, tert-butyl alcohol, hexanol, cyclohexanol, aromatic hydrocarbons such as benzene, toluene or xylene, linear or cyclic acetales such as 1,3-dioxolane or ethylal as well as mixtures thereof. In particular isopropanol is used.

The ratio of organic solvent to the organopolysiloxanes functionalized with at least one UV-light absorbing group is not critical. The organic solvent is used in amount which allows the solution of the organopolysiloxanes functionalized with at least one UV-light absorbing group. In particular, the ratio of the organic solvent(s) to the organopolysiloxanes functionalized with at least one UV-light absorbing group (in wt/wt) is in the range of 10:1 to 1:10, in particular 5:1 to 1:5 such as in the range of 1:1 to 0.5:1.

The term hydroxy carboxylic acid or a cyclic ester thereof used according to the invention encompasses hydroxycarboxylic acids such as glycolic acid or lactic acid, hydroxydicarbonic acids such as tartaric acid or hydroxytricarbonic acids such as citric acid as well as cyclic esters thereof such as ascorbic acid without being limited thereto.

In one subembodiment the hydroxy carboxylic acid or a cyclic ester thereof is always selected from glycolic acid, ascorbic acid and/or citric acid such as in particular citric acid.

The amount of the hydroxy carboxylic acid or a cyclic ester thereof used in the method according to the invention is not critical. Preferably, an amount of 0.05-5 wt.-%, preferably, 0.1-1 wt.-% based on the weight of the organopolysiloxanes functionalized with at least one UV-light absorbing group is used.

Particularly good results are obtained if an additional amount of hydrogen peroxide is present as this accelerates the discoloration and thus reduces the cycle times. The amount of hydrogen peroxide can also be easily determined by a person skilled in the art and is in particular selected in the range of 0.03 to 3 wt.-% based on a 35 wt.-% aqueous hydrogen peroxide solution based on the weight of the organopolysiloxane functionalized with a benzalmalonate.

The method according to the present invention is preferably carried out at elevated temperatures such as in the range of from 40° C. to 150° C., preferably from 40° C. to 80° C., e.g., at about 60° C., wherein the reaction temperature should however not exceed the boiling point of the solvent(s) used.

After the organopolysiloxane functionalized with at least one UV-light absorbing group has been brought into contact with a hydroxy carboxylic acid or a cyclic ester thereof in an organic solvent, optionally in the presence of hydrogen peroxide, the solvent can either be evaporated directly or a subsequent washing step may be included before evaporation of the solvent(s). Such washing steps are well known to a person skilled in the art. In a particular embodiment, a washing step with a mixture of MeOH/water is included. The ratio of MeOH/water is not critical and may range from 20:1 to 5:1 such as e.g. 10:1.

In one subembodiment of the invention, the organopolysiloxanes functionalized with at least one UV-light absorbing group according to the invention always comprise at least one unit selected from the formula (Ia), (Ib), (Ic) and/or (Id)

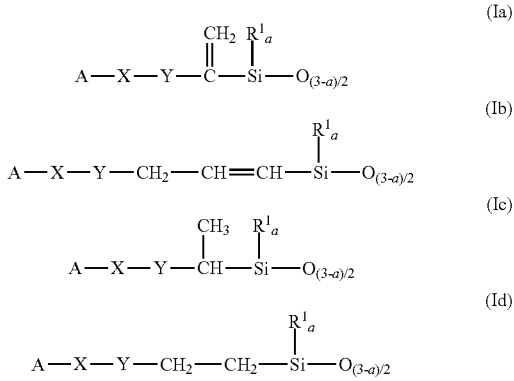

and, optionally, one or several units of formula (II)

wherein
a is 0, 1 or 2,
b is 0, 1, 2, 3;
$R^1$ is a $C_1$-$C_{30}$ hydrocarbon group or a trimethylsilyloxy group, in particular a $C_1$-$C_{10}$ alkyl group such as a methyl group
$R^2$ is hydrogen, a $C_1$-$C_{30}$ hydrocarbon group or a trimethylsilyloxy group, in particular a $C_1$-$C_{10}$ alkyl group such as a methyl group
Y is a divalent $C_1$-$C_{10}$ alkylene or $C_2$-$C_{10}$ alkenylene chain, in particular a $C_1$-$C_4$ alkylene chain such as a methylene group
X is O, NH or $NR^3$ wherein $R^3$ is a $C_1$-$C_{30}$ group in particular a $C_1$-$C_3$ hydrocarbon group
A is a UV-B light absorbing group, a UV-A light absorbing group, a UV-C light absorbing group or a broadband light absorbing group.

The organopolysiloxane functionalized with at least one UV-light absorbing group according to the invention are polymeric materials which may be homopolymers consisting only of units of formula (Ia), (Ib), (Ic) and/or (Id), or they may be copolymers containing units of formula (Ia), (Ib), (Ic) and/or (Id) as well as units of formula (II). The units of formula (Ia), (Ib), (Ic) and/or (Id) may be distributed randomly in the organopolysiloxane, they may be the end blocking units of the polymer or they may be located at the end of the polymer and pending in a chain of the polymer at the same time.

The organopolysiloxane functionalized with at least one UV-light absorbing group may carry only one kind of UV-light absorbing group or may carry at least two units of formula (Ia), (Ib), (Ic) and/or (Id) wherein the UV-light absorbing groups are different such as e.g. a UV-B light absorbing group and a UV-A light absorbing group.

If a is 2 the two substituents $R^1$ may be identical or different. If b is 2 or 3 the two or three substituents $R^2$ may be identical or different. If the polymer contains more than one unit of formula (Ia), (Ib), (Ic) and/or (Id) the substituents $R^1$ may be identical or different from unit to unit. If the polymer contains more than one unit of formula (II) the substituents $R^2$ may be identical or different from unit to unit.

The organopolysiloxanes functionalized with at least one UV-light absorbing group according to the invention may be linear, cyclic, branched or crosslinked. In a particular embodiment the organopolysiloxanes are linear or cyclic organopolysiloxane, characterized in that in the majority of units (Ia), (Ib), (Ic), (Id) and (II) a=1 and b=2. However, if the organopolysiloxane is a linear polymer at least two end blocking units must be present, thus requiring either the presence of two units in which a has a value of 2 or two units in which b is 3. Such organopolysiloxanes generally exhibit a statistical distribution of polymer chain sizes.

In another subembodiment of the invention, the organopolysiloxanes functionalized with at least one UV-light absorbing group are linear organopolysiloxanes comprising one end blocking unit of formula (IIIa) and one end blocking unit of formula (IIIb) [corresponding to units of formula (Ia), (Ib), (Ic) and/or (Id), wherein a=2, respectively (II), wherein b=3]

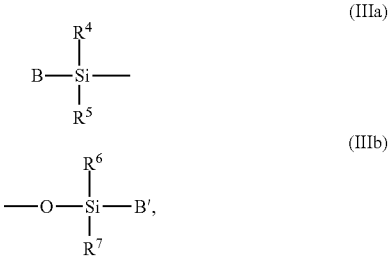

s units selected from the group of (Ia), (Ib), (Ic) and/or (Id) as depicted above wherein a=1 and,
r units of formula (IV) [corresponding to unit of formula (II), wherein b=2]

wherein
s is an integer from 0 to 50,
r is an integer from 0 to 200; and
$R^1$, $R^4$, $R^5$, $R^6$, $R^7$ independently are as defined above for $R^1$;
$R^8$ and $R^9$ independently are as defined above for $R^2$
B and B' independently are a group $R^1$ or a UV-light absorbing group selected from

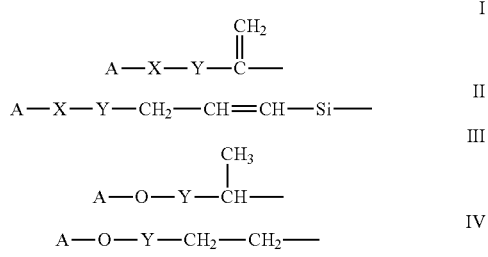

with the proviso that when s is 0 at least B or B' is a group I, II, III or IV.

In a yet other subembodiment, the organopolysiloxanes functionalized with at least one UV-light absorbing group are linear organopolysiloxanes consisting of one unit of formula (IIIa) and one unit of formula (IIIb), 4 to 10, preferably 4 to 7 units of formula (Ia) and/or (Ib) and 40 to 90, preferably 60 to 80 units of formula (IV), wherein $R^1$, $R^2$, $R^4$, $R^5$, $R^6$, $R^7$, $R^8$, $R^9$, B and B' are methyl, Y is methylene and X is O, and wherein the units of formula (Ia) and/or (Ib) are randomly distributed in the organopolysiloxanes chain. It is well understood to a person skilled in the art that the above description of the organopolysiloxanes refers to an average statistical distribution of polymer chain sizes, which might still contain as minor impurities H-siloxane units deriving from the preparation process.

Due to the preparation of the organopolysiloxanes functionalized with at least one UV-light absorbing group by hydrosilylation, i.e. the addition of a H-siloxane unit of an organopolysiloxane to an unsaturated carbon-carbon bond of a UV-light absorbing group, normally units of formula (Ia) as well as (Ib), respectively (Ic) as well as (Id) are formed and thus present at the same time in the organopolysiloxanes functionalized with at least one UV-light absorbing group. In a particular embodiment the ratio of units of formula (Ia) to units of formula (Ib) in the organopolysiloxanes functionalized with at least one UV-light absorbing group is about 4 to 1.

The term $C_1$-$C_{10}$ alkylene used according to the invention includes straight chain or branched saturated hydrocarbon residues such as methylene, 1-ethylene, 2-ethylene, 3-propylene, 2-propylene, 2-methyl-3-propylene, 3-butylene, 4-butylene, 4-pentylene, 5-pentylene, 6-hexylene, and the like.

The term $C_2$-$C_{10}$ alkenylene used according to the invention includes unsaturated hydrocarbon residues containing at least one double bond, such as for example, 2-propen-2-ylene, 2-propen-3-ylene, 3-buten-3-ylene, 3-buten-4-ylene, 4-penten-4-ylene, 4-penten-5-ylene, (3-methyl)-penta-2,4-dien-4 or 5-ylene, 11-dodecen-11-ylene, and the like. The divalent alkylene or alkenylene chains may be interrupted by one or several oxygen atoms.

The term $C_1$-$C_{30}$ hydrocarbon group used according to the invention refers to saturated or unsaturated $C_1$-$C_{30}$ hydrocarbon groups such as $C_1$-$C_{30}$ alkyl such as methyl, ethyl, propyl and butyl; $C_2$-$C_{30}$ alkenyl such as vinyl and allyl; and unsubstituted or substituted aryl such as phenyl, alkaryl and alkoxyphenyl. The hydrocarbon group is unsubstituted or substituted by, e.g. halogen, e.g. a halogenated $C_1$-$C_{18}$ hydrocarbon group. The alkyl and alkenyl groups may be straight chain or branched such as e.g. methyl, ethyl, 3-propyl, 2-propyl, 2-methyl-3-propyl, 3-butyl, 4-butyl, 4-pentyl, 5-pentyl, 6-hexyl, 2-propen-2-yl, 2-propen-3-yl, 3-buten-3-yl, 3-buten-4-yl, 4-penten-4-yl, 4-penten-5-yl, (3-methyl)-penta-2,4-dien-4 or 5-yl, 11-dodecen-11-yl.

The term UV-light absorbing groups refers to all groups which absorb light in the range of wavelengths 400-320 nm (UVA) and 320-290 (UVB) or of even shorter wavelengths (UVC) and which are or can be used as chemical UV filters. The term "broadband light absorbing group" as used herein refers to groups which absorb light in a region overlapping UV-A and UV-B, especially in the range between about 310 and 360 nm. UV-light absorbing groups which may be present in the functionalized organopolysiloxanes of the instant invention are e.g. belonging to the groups of acrylates, p-aminobenzoates, camphor derivatives (such as of benzylidene camphor type), cinnamates, benzophenones, esters of benzalmalonic acid, esters of 2-(4-ethoxy anilinomethylene)propandioic acid, imidazole derivatives, salicylates, triazone derivatives, triazol derivatives, dibenzoylmethanes, anthranilates, amino substituted hydroxybenzophenones, phenyl-benzimidazoles, phenyl-benzoxazoles, indanylidene derivatives and 1,4-dihydropyranes.

Examples for acrylates include 2-ethylhexyl 2-cyano-3,3-diphenylacrylate (octocrylene, PARSOL® 340) and ethyl 2-cyano-3,3-diphenylacrylate;

Examples for p-aminobenzoates include 4-amino benzoic acid, 4-aminobenzoic acid-2,3-dihydroxypropylester, 4-(bis (2-hydroxypropyl)amino)benzoic acid ethyl ester, 4-(dimethylamino)benzoic acid-2-ethylhexylester (e.g. Eusolex® 6007) and ethoxylated 4-aminobenzoic acid ethyl ester (e.g. Uvinul® P25).

Examples for camphor derivatives include 4-methyl benzylidene camphor (PARSOL® 5000), 3-benzylidene camphor, camphor benzalkonium methosulfate, polyacrylamidomethyl benzylidene camphor, sulfo benzylidene camphor, sulphomethyl benzylidene camphor and therephthalidene dicamphor sulfonic acid;

Examples for cinnamates include octyl methoxycinnamate (PARSOL® MCX), ethoxyethyl methoxycinnamate, diethanolamine methoxycinnamate (PARSOL® Hydro) and isoamyl methoxycinnamate.

Examples for benzophenones include benzophenone-3, benzophenone-4,2,2',4,4'tetrahydroxy-benzophenone and 2,2'Dihydroxy-4,4'dimethoxybenzophenone;

Examples for esters of benzalmalonic acid include di(2-ethylhexyl) 4-methoxybenzalmalonate Examples for esters of 2-(4-ethoxy anilinomethylene)propandioic acid include 2-(4-ethoxy anilinomethylene)propandioic acid diethyl ester as described in the European Patent Publication EP 0895 776

Examples for imidazole derivatives include 2-phenyl benzimidazole sulfonic acid and its salts (PARSOL®HS). Salts of 2-phenyl benzimidazole sulfonic acid are e.g. alkali salts such as sodium- or potassium salts, ammonium salts, morpholine salts, salts of primary, sec. and tert. amines like monoethanolamine salts and diethanolamine salts.

Examples for salicylate derivatives include isopropylbenzyl salicylate, benzyl salicylate, butyl salicylate, octyl salicylate (NEO HELIOPAN® OS), isooctyl salicylate or homomenthyl salicylate (homosalate);

Examples for triazone derivatives include octyl triazone (UVINUL® T-150), dioctyl butamido triazone (UVA-SORB® HEB).

Examples for triazol derivatives include benzotriazoles such as 2-(2-hydroxy-5-methylphanyl)benzotriazol, 2,2'-methylene-bis-(6-(2H-benzotriazole-2-yl)-4-(1,1,3,3,-tetramethylbutyl)-phenol (TINOSORB® M) as well as triazols described in EP-A-893119

Examples for dibenzoylmethane derivatives include compounds such as 4-tert. butyl-4'-methoxydibenzoyl-methane (PARSOL®1789), dimethoxydibenzoylmethane and isopropyldibenzoylmethane;

Examples for Amino substituted hydroxybenzophenones include compounds such as 2-(4-Diethylamino-2-hydroxybenzoyl)-benzoic acid hexyl ester as described in the European Patent Publication EP 1046391.

Examples of Indanylidene derivatives refer to compounds such as disclosed in EP 1000950, EP1341752 or EP1485338.

Examples of preferred UV-light absorbing groups A are those comprising a benzoxazol, a benzylidene camphor, a benzimidazole, a dibenzoylmethane, a p-amino benzoic acid, a benzotriazol, a diphenylacrylate or a hydroxybenzophenone group, illustrative examples being shown below:

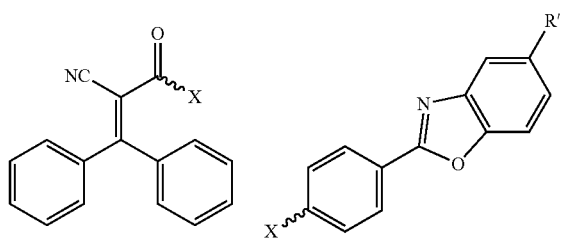
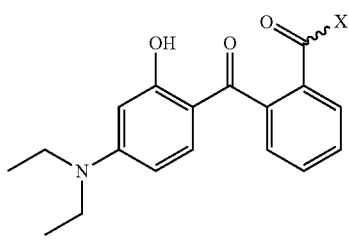
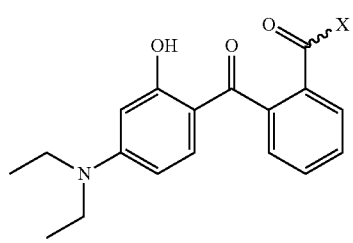
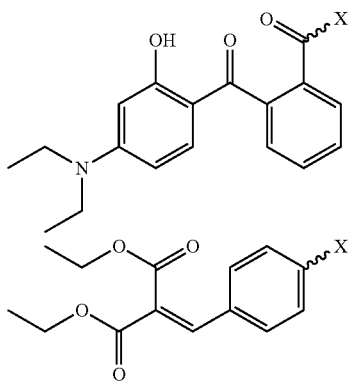
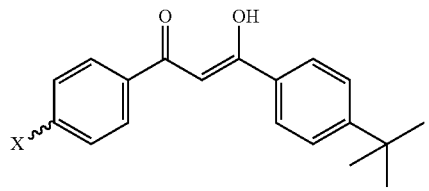
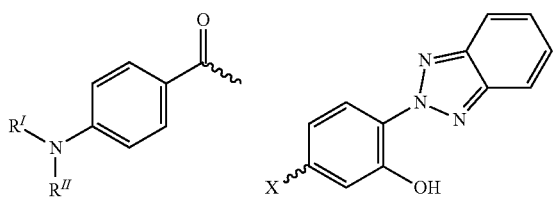
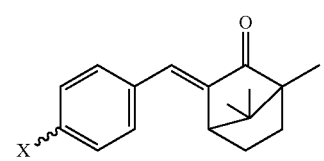
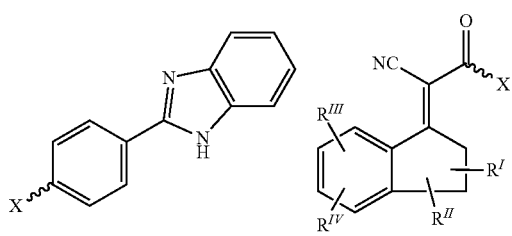

wherein $R^I$ and $R^{II}$ are independently hydrogen or straight or branched chain $C_{1-20}$-alkyl groups, in particular straight $C_{1-3}$-alkyl groups, $R^{III}$ and $R^{IV}$ are independently hydrogen, straight or branched chain $C_{1-20}$-alkyl or straight or branched chain $C_{1-20}$alkoxy groups, in particular straight $C_{1-3}$-alkyl or straight $C_{1-3}$-alkoxy groups such as in particular methyl or methoxy groups. The curly line indicates the linking bond of the UV-light absorbing group A to X of formula (Ia), (Ib), (Ic) and/or (Id). Preferably X is always oxygen (O).

In a particular embodiment, the UV-light absorbing group A is an 2-(4-diethylamino-2-hydroxybenzoyl)benzoyloxymethyl group as depicted below, wherein X is O:

The preparation of such organosilicone functionalized with amino hydroxybenzophenones is e.g. disclosed in EP1494642 or EP1981895.

In another particular embodiment, the organopolysiloxanes functionalized with at least one UV-light absorbing group comprises two different groups A which are selected from 4-[(2,2-diethoxycarbonyl)vinyl]phenoxymethyl and 2-(4-diethylamino-2-hydroxybenzoyl)benzoyl-oxymethyl groups wherein X is O as depicted below:

The preparation of such organosilicones is e.g. disclosed in EP1885769.

In another subembodiment, the UV-light absorbing group A is an indanylidene group. The preparation of such indanylidene functionalized organosilicone derivatives is e.g. disclosed in EP1000950.

The invention is illustrated further by the examples without being limited thereto.

EXAMPLE 1

Discoloration of polysilicone-15 (organopolysiloxane carrying 4-[(2,2-diethoxy-carbonyl)vinyl]phenoxymethyl groups) with citric acid A mixture of 600 g of a sample of polysilicone-15 prepared according to the process disclosed in EP1142930, Example 1 having a Gardner value of 3.5, 398.5 g isopropanol, 1 g citric acid monohydrate and 0.5 g of hydrogenperoxide (35% aqueous solution) was stirred for 4 to 8 h at 60° C. until a Gardner value of about 2 was obtained. The solvent was evaporated at 75° C. under reduced pressure (250-20 mbar) yielding 600 g of polysilicones-15 with a Gardner value of 1.9.

EXAMPLE 2

Discoloration of polysilicone-15 (organopolysiloxane carrying 4-[(2,2-diethoxy-carbonyl)vinyl]phenoxymethyl groups) with ascorbic acid A mixture of 600 g of a sample of polysilicone-15 prepared according to the process disclosed in EP1142930, Example 1 having a Gardner value of 3.5, 398.5 g isopropanol, 1 g ascorbic acid and 0.5 g of hydrogenperoxide (35% aqueous solution) was stirred for 4 to 8 h at 60° C. until a Gardner value of about 2.2 was obtained. The solvent was evaporated at 75° C. under reduced pressure (250-20 mbar) yielding 600 g of polysilicones-15 with a Gardner value of 2.2.

EXAMPLE 3

Discoloration of an organopolysiloxane compound according to example B2 of EP1494642 carrying 2-(4-diethylamino-2-hydroxybenzoyl)benzoyl-oxymethyl groups A mixture of 1 g of a of a brownish oil prepared according to example B2 EP1494642, 0.66 g isopropanol, 2 mg citric acid monohydrate and 1 mg of hydrogenperoxide (35% aqueous solution) was stirred for 8 h at 60° C. The solvent was evaporated at 75° C. under reduced pressure (250-20 mbar) resulting in a slightly yellow oil.

EXAMPLE 4

Discoloration of an organopolysiloxane compound according to example 9 of EP1000950 carrying indanylidene residues A mixture of 1 g of a of a yellow oil prepared according to example 9 of EP1000950, 0.66 g isopropanol, 2 mg citric acid monohydrate and 1 mg of hydrogenperoxide (35% aqueous solution) was stirred for 8 h at 60° C. The solvent was evaporated at 75° C. under reduced pressure (250-20 mbar) resulting in lighter yellow oil. The colors before and after the treatment were determined visually according to Tints; PANTONE Color Tint Selector, The PANTONE Library of Color. An improvement of the color index was observed reflected by a color change from 109 C. to 101 C.

EXAMPLE 5

Discoloration of an Organopolysiloxane Compound Carrying Benzoxazole Residues

A mixture of 0.5 g of a of a light brown oil prepared according to example 1 of WO2004/007592 using 1.8 mmol of 2-(4-prop-2-ynyloxy-phenyl)-benzoxazole, 1.2 mmol hexen and a silicone resin having an SiH content of 10 mmol/g and a viscosity of 20 mPA, 0.33 g isopropanol, 1 mg citric acid monohydrate and 0.5 mg of hydrogenperoxide (35% aqueous solution) was stirred for 8 h at 60° C. The solvent was evaporated at 75° C. under reduced pressure (250-20 mbar) resulting in a slightly beige oil. The colors before and after the treatment were determined visually according to Tints; PANTONE Color Tint Selector, The PANTONE Library of Color. An improvement of the color index was observed reflected by a color change from 4515 C to 4545 C.

The invention claimed is:

1. A method for improving the color index of an organopolysiloxane functionalized with at least one UV-light absorbing group, wherein the method comprises the steps of:
   (a) treating an organopolysiloxane functionalized with at least one UV-light absorbing group by contacting the organopolysiloxane with a hydroxy carboxylic acid or a cyclic ester thereof in an organic solvent; and
   (b) washing the organopolysiloxane treated according to step (a) with a methanol/water mixture.

2. The method according to claim 1, wherein the organopolysiloxane functionalized with at least one UV-light absorbing group exhibits a Gardner value of less than 2.9 after having been contacted with the hydroxy carboxylic acid or a cyclic ester thereof.

3. The method according to claim 2, wherein the Gardner value of the organopolysiloxane is less than 2.5.

4. The method according to claim 2, wherein the Gardner value of the organopolysiloxane is in the range of 0.01 to 2.

5. The method according to claim 1, wherein the organic solvent is selected from a $C_{1-8}$ alkylalcohol, an acetate, an aromatic hydrocarbon or mixtures thereof.

6. The method according to claim 1, wherein the organic solvent is isopropanol.

7. The method according to claim 1, wherein the organopolysiloxane functionalized with at least one UV-light absorbing group comprises at least one unit selected from the formula (Ia), (Ib), (Ic) and/or (Id)

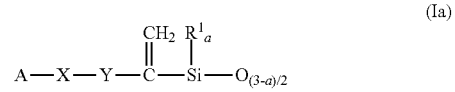

(Ia)

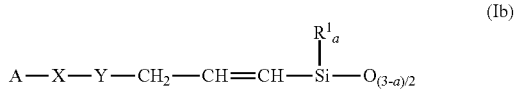

(Ib)

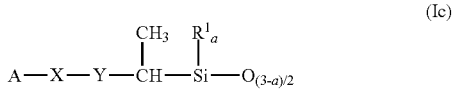

(Ic)

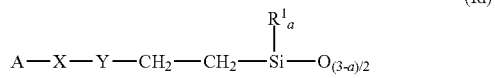

(Id)

and, optionally, one or several units of formula (II)

(II)

wherein a is 0, 1 or 2, b is 0, 1, 2, 3;

$R^1$ is a $C_1$-$C_{30}$ hydrocarbon group or a trimethylsilyloxy group;

$R^2$ is hydrogen, a $C_1$-$C_{30}$ hydrocarbon group or a trimethylsilyloxy group;

Y is a divalent $C_1$-$C_{10}$ alkylene or $C_2$-$C_{10}$ alkenylene chain;

X is O, NH or $NR^3$ wherein $R^3$ is a $C_1$-$C_{30}$; and

A is a UV-B light absorbing group, a UV-A light absorbing group, a UV-C light absorbing group or a broadband light absorbing group.

8. The method according to claim 7, wherein the organopolysiloxane functionalized with at least one UV-light absorbing group is a linear organopolysiloxane comprising: one end blocking unit of formula (IIIa) and one end blocking unit of formula (IIIb)

(IIIa)

-continued

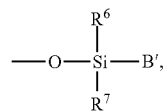
(IIIb)

s units selected from the group of (Ia), (Ib), (Ic) and/or (Id) wherein a=1, and
r units of formula (IV)

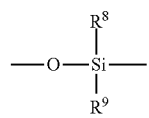
(IV)

wherein
s is an integer from 0 to 50,
r is an integer from 0 to 200,
$R^1$, $R^4$, $R^5$, $R^6$, $R^7$ independently are as defined above for $R^1$
$R^8$ and $R^9$ independently are as defined above for $R^2$
B and B' independently are a group $R^1$ or a UV-light absorbing group selected from

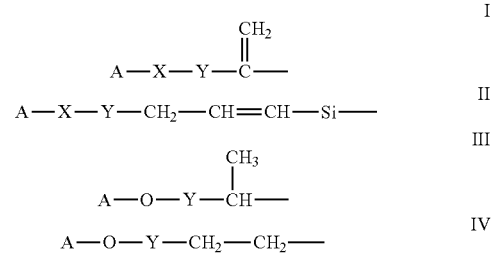

with the proviso that when s is 0 at least B or B' is a group I, II, III or IV.

9. The method according to claim 7, wherein
Y is a $C_1$-$C_4$ alkylene chain, and
X $NR^3$ wherein $R^3$ is a $C_1$-$C_3$ hydrocarbon group.

10. The method according to claim 9, wherein Y is a methylene group.

11. The method according to claim 1, wherein the UV-light absorbing group A is a 2-(4-diethylamino-2-hydroxybenzoyl)benzoyloxymethyl group.

12. The method according to claim 1, wherein two different UV-light absorbing groups A selected from 4-[(2,2-diethoxycarbonyl)vinyl]phenoxymethyl and 2-(4-diethylamino-2-hydroxybenzoyl)benzoyl-oxymethyl group are present.

* * * * *